United States Patent
Kim

(10) Patent No.: US 7,937,242 B2
(45) Date of Patent: May 3, 2011

(54) METHOD FOR CLASSIFYING OCCUPANT WEIGHT OF VEHICLE

(75) Inventor: Doh Yoon Kim, Yongin-shi (KR)

(73) Assignee: Hyundai Mobis Co., Ltd., Kyunggi-Do (KR)

( * ) Notice: Subject to any disclaimer, the term of this patent is extended or adjusted under 35 U.S.C. 154(b) by 1138 days.

(21) Appl. No.: 11/305,130

(22) Filed: Dec. 19, 2005

(65) Prior Publication Data

US 2007/0061102 A1   Mar. 15, 2007

(30) Foreign Application Priority Data

Sep. 12, 2005   (KR) .......................... 10-2005-0084846

(51) Int. Cl.
*G01G 11/04* (2006.01)
(52) U.S. Cl. ...................................................... 702/173
(58) Field of Classification Search .................. 702/79, 702/91, 104, 116, 129, 173; 701/45; 177/144
See application file for complete search history.

(56) References Cited

U.S. PATENT DOCUMENTS

| | | | |
|---|---|---|---|
| 7,039,514 B2 * | 5/2006 | Fortune | 701/45 |
| 2003/0040858 A1 * | 2/2003 | Wallace | 701/45 |
| 2003/0056997 A1 * | 3/2003 | Breed et al. | 177/144 |
| 2004/0016577 A1 * | 1/2004 | Lichtinger et al. | 177/144 |

* cited by examiner

*Primary Examiner* — Mohamed Charioui
(74) *Attorney, Agent, or Firm* — Greenblum & Bernstein, P.L.C.

(57) ABSTRACT

A method for classifying an occupant weight of a vehicle is disclosed. When an occupant gets in to or gets off a vehicle, an occupant weight is quickly classified by relatively shortening time for classifying the occupant weight into a certain weight class, and when the weight is changed according to vibration of the vehicle or a movement of the occupant in a state that a vehicle seat is occupied by the occupant, time for re-classifying the weight class is lengthened to thereby prevent frequent re-classification of the occupant weight, and accordingly, the reliability of an occupant weight classification system can be enhanced.

15 Claims, 6 Drawing Sheets

METHOD FOR CLASSIFYING OCCUPANT WEIGHT OF VEHICLE

This Nonprovisional application claims priority under 35 U.S.C. §119(a) on Patent Application No. 10-2005-84846 filed in Korea on Sep. 12, 2005, the entire contents of which are hereby incorporated by reference.

BACKGROUND OF THE INVENTION

1. Field of the Invention

The present invention relates to a method for classifying a occupant weight of a vehicle and, more particularly, to a method for classifying an occupant weight of a vehicle capable of shortening an occupant weight classification time when a change in a weight of an occupant is sensed according to occupant's occupancy and vacancy of a vehicle seat and lengthening an occupant weight classification time when a change in a weight of the occupant is sensed according to a movement of the occupant.

2. Description of the Related Art

FIG. 1 shows an airbag deployment situation of a general vehicle and FIG. 2 is a perspective view showing an occupant weight sensor for sensing a weight of an occupant.

In general, an airbag 6 is installed at a front side or at the side in a vehicle in order to safely protect the occupant by using its cushion operation in occurrence of a vehicle collision accident.

The airbag 6 includes a driver airbag (DAB) installed in a steering wheel to protect the front side of a driver seated in a driver's seat and a passenger airbag (PAB) installed at an instrument panel to protect the front side of an occupant seated in the passenger's seat.

In addition, recently, in order to protect the occupant against a side collision, as well as to protect the front side of the occupant, a side airbag is installed in the backrest of the vehicle seat or a door trim, a curtain airbag is mounted in a loop rail part and deployed in a curtain state between the occupant and a side window, and a side protecting airbag such as an ITS (Inflatable tubular Structure) is mounted at an inner side a head liner at an upper side of a door of the front seat.

Since the airbag 6 is instantaneously inflated, if its deployment force is excessive, it would inevitably do harm to the occupant. Thus, a system is under development to sense the weight of the occupant and classify the occupant based on the sensed weight in order to deploy the airbag with a suitable deployment force according to a type of each occupant based on physical conditions to thereby protect various occupants each with various physical conditions.

A weight sensor 4 for sensing the weight of the occupant is installed at a lower side of the driver's seat or the passenger's seat and senses the weight of the seated occupant, and a weight classification system for classifying the occupant based on the weight value sensed by the weight sensor and including a controller (not shown) is provided in the vehicle.

Namely, when the weight of the occupant seated in the driver's or the passenger's seat 2 is sensed through the weight classification system, the weight is classified into an 'empty', 'child' and 'adult' weight class and whether to deploy the airbag and its deployment force are determined accordingly.

FIG. 3 illustrates a method for classifying an occupant weight of a vehicle in accordance with a related art. In the related art, once an occupant gets in to a vehicle, the occupant is classified into a weight class [0] and a weight class [1] based on a first reference value (Th1) and classified into the weight class [1] and a weight class [2] based on a second reference value (Th2) according to its weight sensed by the weight classification system. As the occupant is gets in to or off the vehicle, a change in the weight is sensed and the weight class is changed accordingly.

However, if the weight of the occupant is close to the reference value serving as a reference for discriminating each weight class, the weight would be frequently changed between the weight classes adjacent to the reference value according to vehicle vibration and a movement of the occupant. Then, a warning light would be repeatedly lighted on and off according to the weight classification, which interferes driver's concentration to driving.

SUMMARY OF THE INVENTION

The present invention is designed to solve such problem of the related art, and therefore, an object of the present invention is to provide method for classifying an occupant weight of a vehicle capable of shortening an occupant weight classification time when a change in a weight of an occupant is sensed according to occupant's occupancy and vacancy of a vehicle seat and lengthening the occupant weight classification time when a change in a weight of the occupant is sensed according to a movement of the occupant.

To achieve the above object, there is provided a method for classifying an occupant weight of a vehicle including: a first step of sensing a weight of an occupant who gets in to or gets off a vehicle and classifying the occupant weight into at least one or more weight classes; and a second step of changing a weight class after a pre-set first classification time lapses in case where the occupant gets in to or gets off the vehicle, and changing a weight class after a pre-set second classification time lapses in other cases.

Herein, the other cases refer to a case, for example, where a change in the weight of the occupant is sensed according to simple vibration of the vehicle or a movement of the occupant, rather than according to the occupant's occupancy and vacancy of a vehicle seat. Since the second classification time is set to be longer than the first classification time, such a problem as in the related art that the weight class is frequently changed according to a temporary movement of the occupant can be solved.

In the first step, when the weight is not greater than a first reference value, it is classified into a weight class [0], namely, an empty state, when the weight is greater than the first reference value but not greater than a second reference value, it is classified into a weight class [1], namely, a child occupant, and when the weight is greater than the second reference value, it is classified into a weight class [2], namely, an adult occupant.

That is, when the weight class is changed from the weight class [0] to the weight class [1] and vice versa, or from the weight class [0] to the weight class [2] and vice versa as an occupant gets in to or gets off a vehicle, the weight class is changed within the first classification time, and when the weight class is changed from the weight class [1] to the weight class [2] and vice versa, the weight class is changed after the second classification time, namely, a time period during which the weight of the occupant is changed is longer than the first classification time, lapses.

In addition, each weight is classified by three weight classes based on the first reference value and the second reference value greater than the first reference value, and only when a change value of a weight sensed according to a movement of an occupant in a current weight class exceeds an error value based on the first and second reference values, the current weight class can be changed. A time period for allowing a change of the weight class according to a movement of the occupant is longer than a time period for allowing a change of the weight class according to the occupant's occupancy and vacancy of the vehicle seat.

The error value includes a first error value added to or subtracted from the first reference value and a second error value added to or subtracted from the second reference value and greater than the first error value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
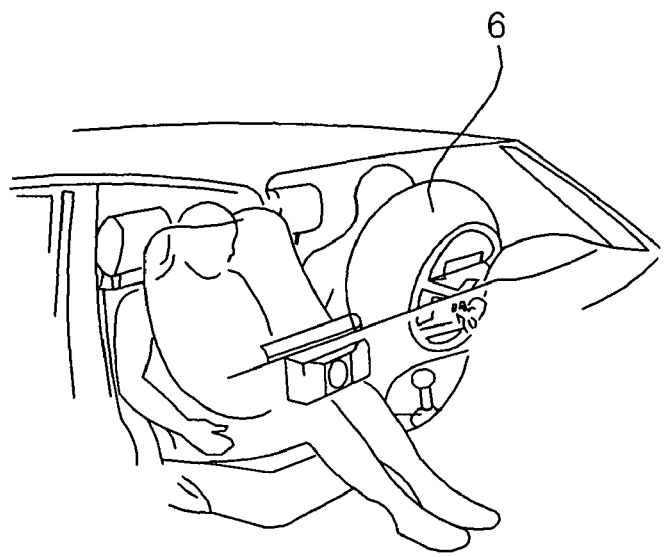
FIG. 1 illustrates an airbag deployment situation in a general vehicle.
Figure 2:
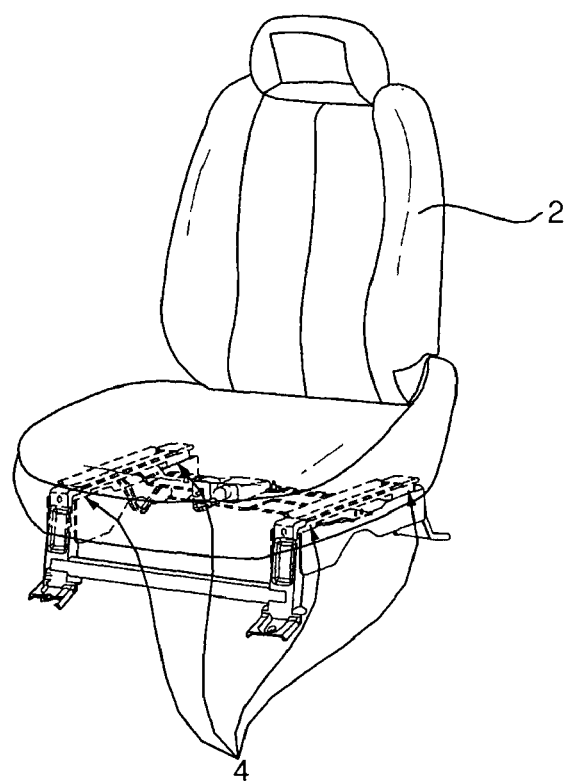
FIG. 2 is a perspective view showing a weight sensor of the general vehicle.

A method for classifying an occupant weight of a vehicle in accordance with the preferred embodiment of the present invention will now be described with reference to the accompanying drawings.

There can be a plurality of embodiments of the method for classifying an occupant weight of a vehicle in accordance with the present invention without being limited to those described in the present invention.

The method for classifying an occupant weight of a vehicle in accordance with the present invention will now be described with reference to FIGS. 4 to 7.

First, when a person gets in to a vehicle and seated in a vehicle seat, a weight of the occupant is sensed and classified into one of several weight classes.

In this case, the weight is classified into one of at least three weight classes based on a first reference value and a second reference value greater than the first reference value.

When the vehicle starts, the weight of the occupant is sensed by an occupant weight sensor installed at a lower side of the vehicle seat on which the occupant is seated, based on which a controller of an occupant weight classification system checks the occupant's occupancy or vacancy of the vehicle seat and classifies the occupant weight.

When the weight (W) of the occupant sensed by the weight sensor is not greater than the first reference value (Th1), it is classified into a weight class [0] (steps S4 and S6). When the weight (W) is greater than the first reference value (Th1) but not greater than the second reference value (Th2), it is classified into a weight class [1], namely, a state that the vehicle seat is occupied by a child (steps S8 and S10). When the weight (W) is greater than the second reference value (Th2), it is classified into a weight class [2], namely, a state that the vehicle seat is occupied by an adult (steps S12 and S14).

When the occupant gets in to or gets off the vehicle, the weight class is changed after a pre-set first classification time lapses, and in other cases, the weight class is changed after a pre-set second classification time lapses. The other cases refer to a case, for example, where a change in the weight is sensed according to vibration of the vehicle or a movement of the occupant, not such a case where the change in the weight is sensed as the occupant gets in to or gets off the vehicle.

After the occupant weight is classified, when a change in the weight (W) is sensed by the weight sensor, it is checked whether the change was caused by vibration of the vehicle or a temporary movement of the occupant as the occupant changes his/her position in the vehicle seat, or whether the change was caused as the occupant gets in to or gets off the vehicle, and the occupant weight is classified again accordingly.

In this case, in the present invention, a range of the weight in which the weight class is re-classified differs according to each weight class of the currently classified weight, which will now be described with reference to FIGS. 5 to 8.

Figure 5:
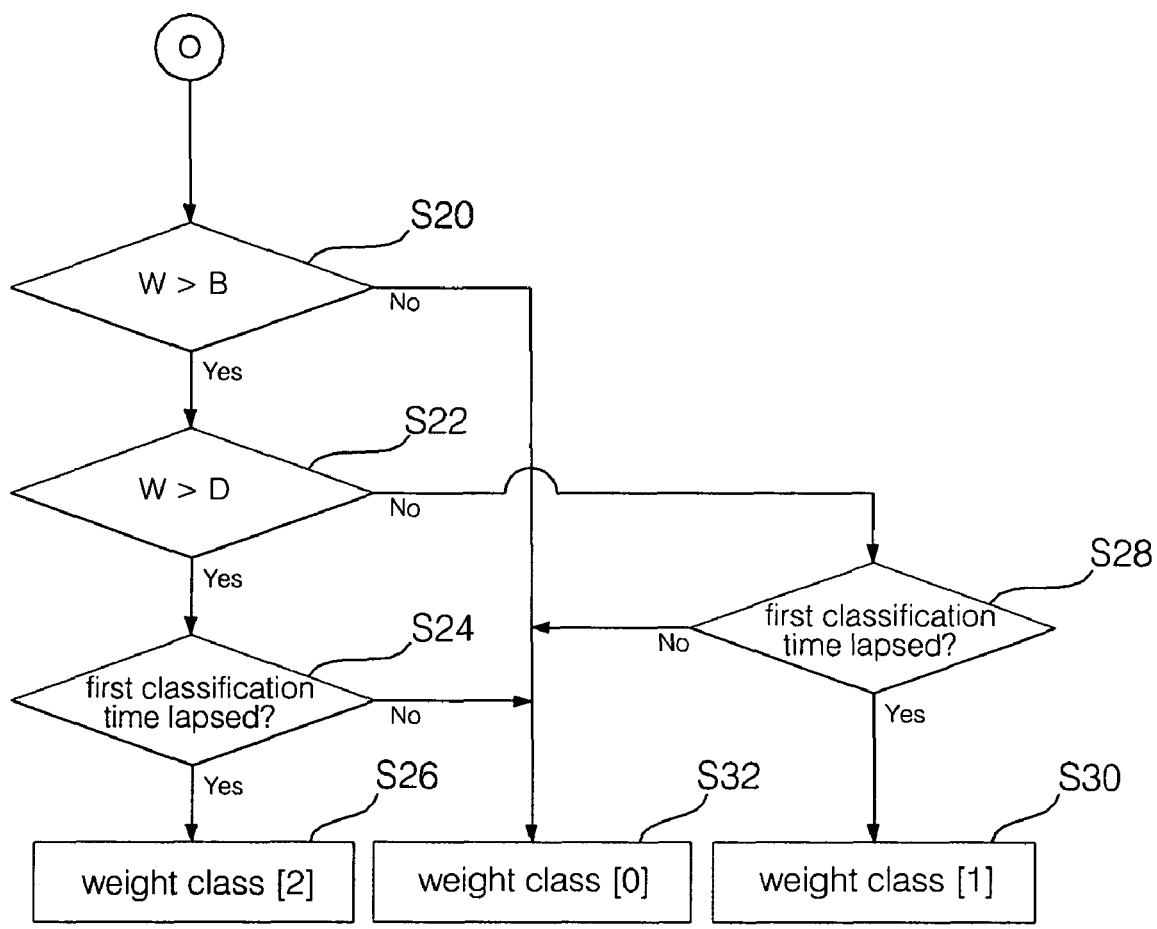
FIG. 5 is a detailed flow chart of a weight class [0] of FIG. 4.

FIG. 5 is a flow chart of a method of re-classifying a weight according to its change after the weight has been classified into the weight class [0].

In the state that the weight (W) is classified into the weight class [0], when the weight (W) does not exceed a first intermediate (boundary) maximum value (B) greater by an error value than the first reference value (Th1), the weight (W) is sustained to be in the weight class [0]. That is, although the weight exceeds the first reference value, namely, the intermediate value between the weight class [0] and the weight class [1], if the excessive portion of the weight comes within the error range, it is determined as a change in the weight according to a minor movement of an occupant, so the weight is not re-classified (steps S20 and S32).

If, however, the weight (W) of the occupant exceeds the first intermediate maximum value (B) but smaller than a second intermediate maximum value (D) greater by an error value than the second reference value (Th2), the weight (W) is re-classified after the first classification time lapses. In the case where the classification of the weight (W) is changed from the weight class [0] to the weight class [1], it is determined that the seat is occupied by a child. When the weight class is changed as the occupant gets in to the vehicle, the change of the weight class is quickly made after the first classification time lapses (steps S22, S28 and S30).

When the weight (W) of the occupant exceeds the second intermediate maximum value (D), it is determined that the seat is occupied by an adult and the weight is re-classified into the weight class [2] after the first classification time lapses (steps S22, S24 and S26).

Figure 6:
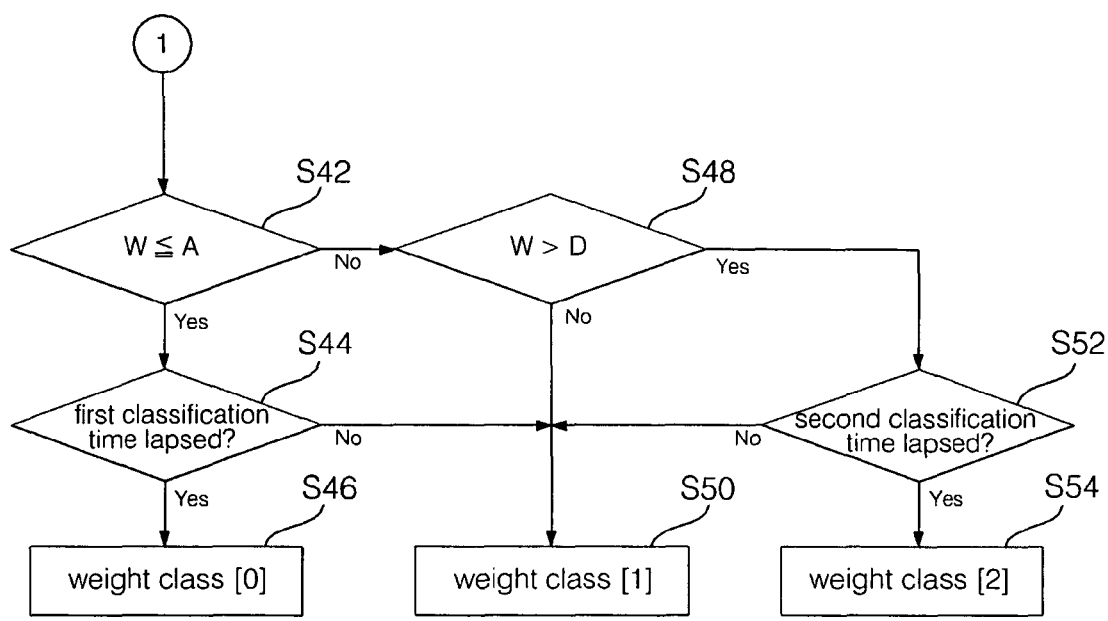
FIG. 6 is a detailed flow chart of a weight class [1] of FIG. 4.

FIG. 6 is a flow chart of a method of re-classifying a weight according to its change after the weight has been classified into the weight class [1].

In the state that the weight (W) of an occupant is classified into the weight class [1], when the weight (W) is not greater than a first intermediate minimum value (A) smaller by an error value than the first reference value (Th1), the weight class [1] of the weight (W) is changed to the weight class [0] after the first classification time lapses. That is, although a weight value smaller than the first reference value, namely, the intermediate value between the weight class [0] and the weight class [1], is sensed, if it comes within the error range, it is determined that the weight was changed because of a movement of the occupant, not because the occupant has got off the vehicle, so the weight is not re-classified (steps S42, S44 and S46).

When the weight (W) of the occupant exceeds the first intermediate minimum value (A) but not greater than the second intermediate maximum value (D) greater by the error value than the second reference value (Th2), the weight class [1] is sustained. Also, in this case, although the weight of the occupant exceeds the second reference value, namely, the intermediate value between the weight class [1] and the weight class [2], if the excessive portion of the weight comes within the error range, it is determined that the weight was changed according to a movement of the occupant, and thus, the weight is not re-classified (steps S48 and S50).

If the weight (W) of the occupant exceeds the second intermediate maximum value (D), the weight class of the weight (W) is changed after the second classification time lapses, and if the second classification time does not lapse, the weight class of the weight (W) is sustained. The reason for this is because the weight is changed from the weight class [1] to the class [2] according to a movement of the occupant, not as the occupant gets in to or gets off the vehicle, so in order to prevent a frequent change of the weight class, the weight class is not changed until the second classification time during which the weight of the occupant is changed is longer than the first classification time lapses (steps S48, S52 and S54).

Figure 7:
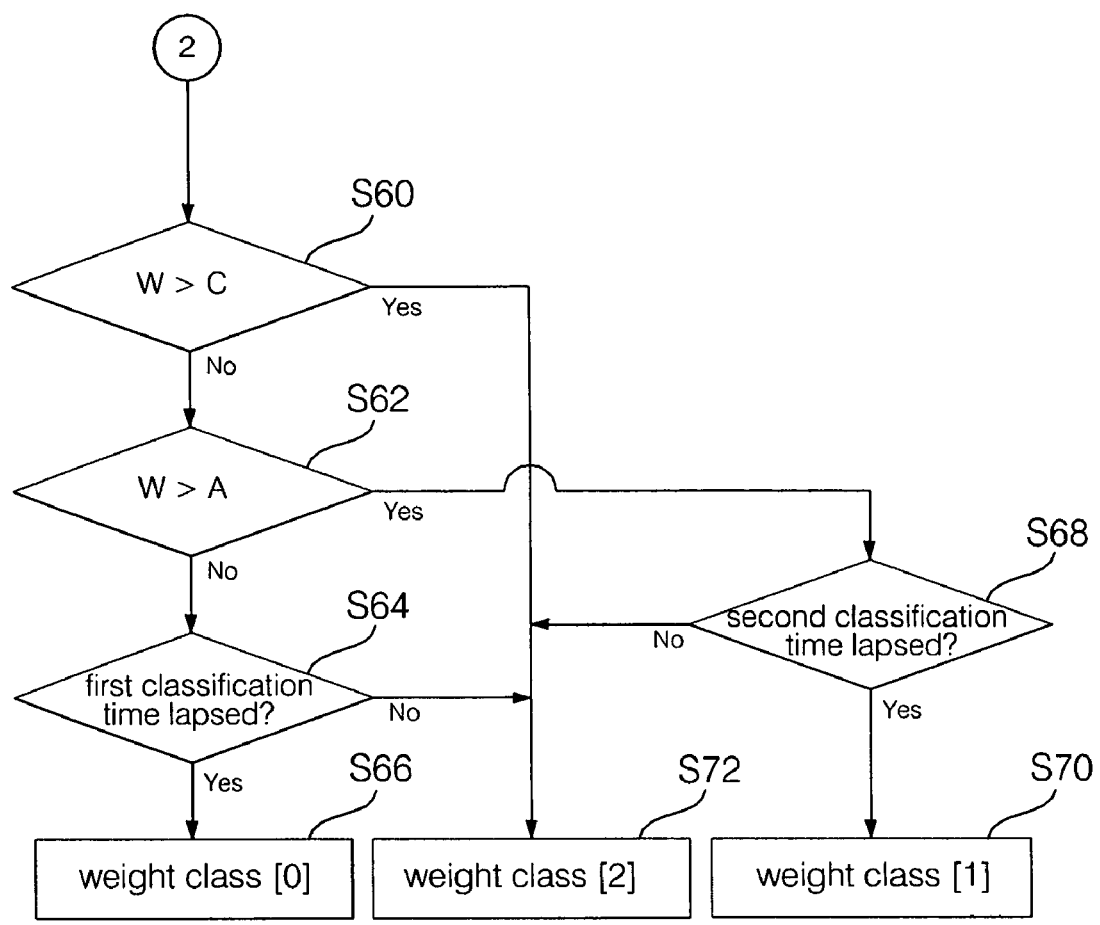
FIG. 7 is a detailed flow chart of a weight class [2] of FIG. 4.

Likewise, FIG. 7 is a flow chart of a method of re-classifying a weight according to its change after the weight has been classified into the weight class [2].

In the state that the weight (W) is classified into the weight class [2], when the weight (W) is not greater than the first intermediate minimum value (A) smaller by the error value than the first reference value (Th1), since it is determined that the occupant has got off the vehicle, the weight (W) is changed to the weight class [0] quickly when the first classification time lapses (steps S60, S62, S64 and S66).

When the weight (W) exceeds the first intermediate minimum value (A) but not greater than a second intermediate minimum value (C) smaller by the error value than the second reference value (Th2), since the weight (W) is changed from the weight class [2] to the weight class [1] according to a movement of the occupant, not because the occupant gets in to or gets off the vehicle, the weight class [2] is not changed to the weight class [1] until the second classification time according to the change in the weight because of the movement lapses, thereby preventing frequent change of the classes (steps S60, S62, S68 and S70).

In addition, when the weight (W) of the occupant is smaller than the second reference value (Th2) but exceeds the second intermediate minimum value (C), since the change in the weight is sensed within the error range, the weight class [2] is sustained (steps S60 and S72).

That is, in the present invention, only when the weight value sensed according to a movement of the occupant exceeds the error value centering on the first and second reference values at the current classified class, the weight class is changed, and when time during which the weight is changed according to the movement of the occupant passes the second classification time, the weight class is changed. And when the time during which the weight is changed as the occupant gets in to or gets off the vehicle passes the first classification time shorter than the second classification time. Therefore, the change of the weight class according to the occupant's occupancy and vacancy of a vehicle seat can be quickly made, and frequent re-classification of the weight class according to the movement of the occupant can be prevented.

In this case, the error value includes first error values (B-Th1 and Th1-A) added to or subtracted from the first reference value (Th1) and second error values (D-Th2 and Th2-C) added to or subtracted from the second reference value (Th2), and the second error values are set to be greater than the first error values.

That is, because the first reference value (Th1) is the intermediate value between the weight class [0] and the weight class [1], the first error values are set to be relatively small to make the error range narrower, and because the second reference value (Th2) is the intermediate value between the weight class [1] and the weight class [2], the second error values are set to be greater than the first error values to make the error range broader.

In this embodiment of the present invention, the first error value is set as 2 kg and the second error value is set as 3 kg.

Figure 3:
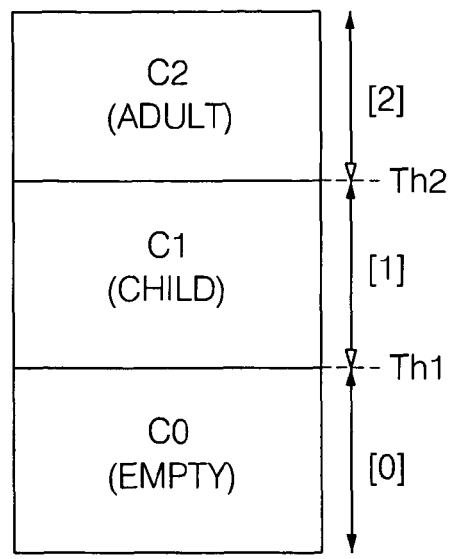
FIG. 3 illustrates the structure of weight classification of a vehicle in accordance with a related art.
Figure 4:
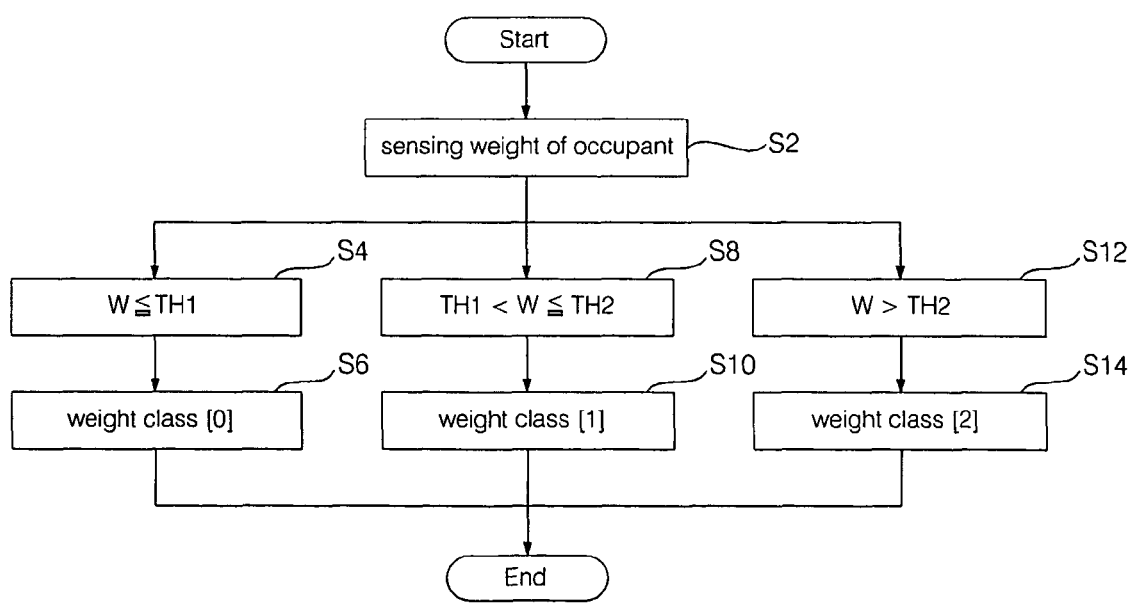
FIG. 4 is a flow chart illustrating the processes of a method for classifying an occupant weight of a vehicle in accordance with the present invention.
Figure 8:
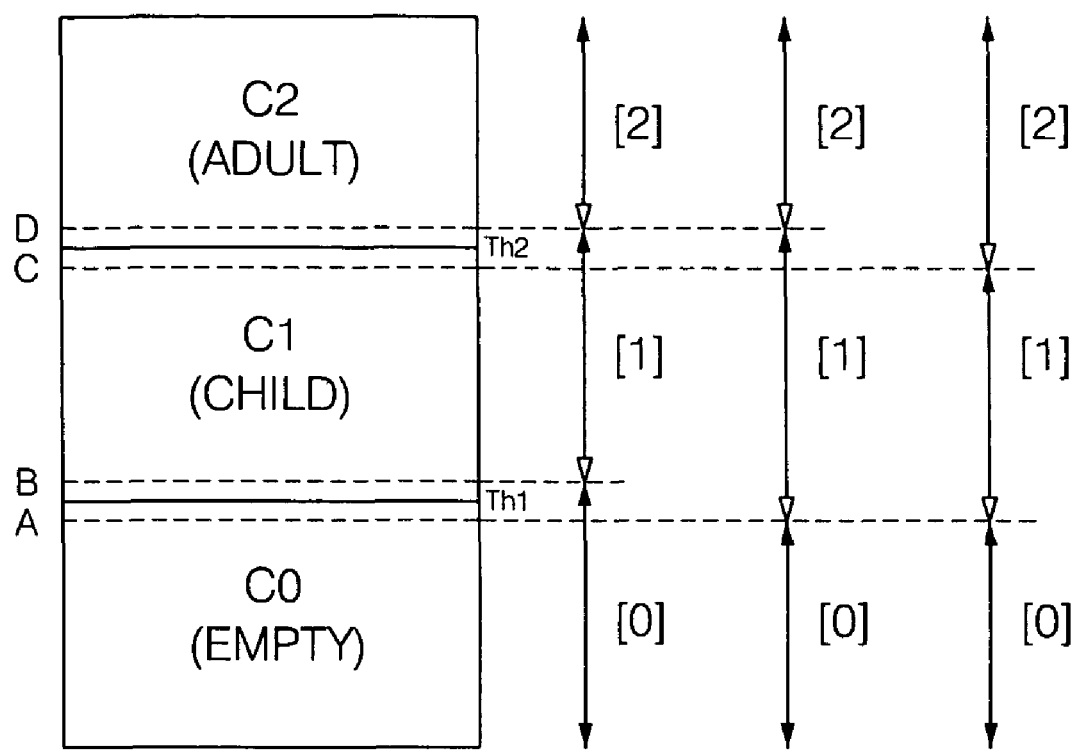
FIG. 8 illustrates the structure of vehicle occupant weight classification in accordance with the present invention.

FIG. 8 illustrates the structure of vehicle occupant weight classification in accordance with the present invention, which is compared with that of the related art as shown in FIG. 3.

That is, although a weight in a currently classified weight class exceeds the reference value, if it is within the error range, the weight is sustained in the current weight class level. Therefore, although the weight of an occupant has a value close to the reference value, its weight class is not frequently re-classified according to a small movement. Thus, the reliability can be enhanced and the phenomenon that the warning light is frequently turned on/off can be prevented.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A method for classifying an occupant weight in a vehicle, comprising:
    sensing an occupant weight in a vehicle and classifying the occupant weight into a weight class in accordance with the sensed occupant weight; and
    changing the weight class after a pre-set first classification time lapses when an occupant enters or exits the vehicle and a change of the occupant weight is sensed, and changing the weight class after a pre-set second classification time lapses when the occupant remains in the vehicle and a change of the occupant weight is sensed.

2. The method of claim 1,
    wherein, when the sensed occupant weight is not greater than a first reference value, the sensed occupant weight is classified into a first weight class, when the sensed occupant weight is greater than the first reference value but is not greater than a second reference value, the sensed occupant weight is classified into a second weight class, and when the sensed occupant weight is greater than the second reference value, the sensed occupant weight is classified into a third weight class.

3. The method of claim 2,
    wherein, when the weight class is changed from the second weight class to the third weight class or from the third weight class to the second weight class, the weight class is changed after the second classification time lapses.

4. The method of claim 2,
wherein, when the sensed occupant weight is classified into the first weight class,
when the sensed changed occupant weight is not greater than a first intermediate maximum value greater by a first error value than the first reference value, the first weight class is sustained,
when the sensed changed occupant weight exceeds the first intermediate maximum value but is not greater than a second intermediate maximum value greater by a second error value than the second reference value, the weight class is changed to the second weight class after the first classification time lapses, and
when the sensed changed occupant weight exceeds the second intermediate maximum value, the weight class is changed to the third weight class after the first classification time lapses.

5. The method of claim 2,
wherein, when the sensed occupant weight is classified into the second weight class,
when the sensed changed occupant weight is not greater than a first intermediate minimum value smaller by a first error value than the first reference value, the weight class is changed to the first weight class after the first classification time lapses,
when the sensed changed occupant weight exceeds the first intermediate minimum value but is not greater than a second intermediate maximum value greater by a second error value than the second reference value, the second weight class is sustained, and
when the sensed changed occupant weight exceeds the second intermediate maximum value, the weight class is changed to the third weight class after the second classification time lapses.

6. The method of claim 2,
wherein, when the sensed occupant weight is classified into the third weight class,
when the sensed changed occupant weight is not greater than a first intermediate minimum value smaller by a first error value than the first reference value, the weight class is changed to the first weight class after the first classification time lapses,
when the sensed changed occupant weight exceeds the first intermediate minimum value but is not greater than a second intermediate minimum value smaller by a second error value than the second reference value, the weight class is changed to the second weight class after the second classification time lapses, and
when the sensed changed occupant weight exceeds the second intermediate minimum value, the third weight class is sustained.

7. The method of claim 1,
wherein the first classification time is shorter than the second classification time,
wherein the second classification time is a time period for allowing a change of the weight class when a change of the occupant weight is sensed according to a movement of the occupant, and
wherein the first classification time is a time period for allowing a change of the weight class when the change of the occupant weight is sensed according to the occupant's occupancy or vacancy of the vehicle seat.

8. The method of claim 7,
wherein, when the sensed occupant weight is not greater than a first reference value, the sensed occupant weight is classified into a first weight class, when the sensed occupant weight is greater than the first reference value but is not greater than a second reference value, the sensed occupant weight is classified into a second weight class, and when the sensed occupant weight is greater than the second reference value, the sensed occupant weight is classified into a third weight class.

9. The method of claim 8,
wherein, when the sensed occupant weight is classified into the first weight class,
when the sensed changed occupant weight is not greater than a first intermediate maximum value greater by a first error value than the first reference value, the first weight class is sustained,
when the sensed changed occupant weight exceeds the first intermediate maximum value but is not greater than a second intermediate maximum value greater by a second error value than the second reference value, the weight class is changed to the second weight class, and
when the sensed changed occupant weight exceeds the second intermediate maximum value, the weight class is changed to the third weight class.

10. The method of claim 8,
wherein, when the sensed occupant weight is classified into the second weight class,
when the sensed changed occupant weight is not greater than a first intermediate minimum value smaller by a first error value than the first reference value, the weight class is changed to the first weight class,
when the sensed changed occupant weight exceeds the first intermediate minimum value but is not greater than a second intermediate maximum value greater by a second error value than the second reference value, the second weight class is sustained, and
when the sensed changed occupant weight exceeds the second intermediate maximum value, the weight class is changed to the third weight class.

11. The method of claim 8,
wherein, when the sensed occupant weight is classified into the third weight class,
when the sensed changed occupant weight is not greater than a first intermediate minimum value smaller by a first error value than the first reference value, the weight class is changed to the first weight class,
when the sensed changed occupant weight exceeds the first intermediate minimum value but is not greater than a second intermediate minimum value smaller by a second error value than the second reference value, the weight class is changed to the second weight class, and
when the sensed changed occupant weight exceeds the second intermediate minimum value, the third weight class is sustained.

12. The method of claim 1,
wherein the occupant weight of the vehicle is classified by three weight classes based on a first reference value and a second reference value greater than the first reference value,
wherein the weight class is changed only when a change of the occupant weight sensed according to the occupant moving exceeds an error value based on the first reference value or the second reference value, and
wherein a time period for allowing a change of the weight class according to the occupant moving while remaining in a vehicle seat is longer than a time period for allowing a change of the weight class according to the occupant entering or exiting the vehicle seat.

13. The method of claim 12,
wherein the error value comprises a first error value obtained by adding a first value to the first reference value or subtracting the first value from the first reference value, or a second error value greater than the first error value and obtained by adding a second value to the second reference value or subtracting the second value from the second reference value.

14. The method of claim 13,
wherein the first error value is 2 kg and the second error value is 3 kg.

15. The method of claim 1,
wherein the first classification time is shorter than the second classification time.

* * * * *